Oct. 18, 1927.
J. M. NEWTON
1,646,166
TIRE REPAIR KNIFE
Filed Jan. 3, 1927
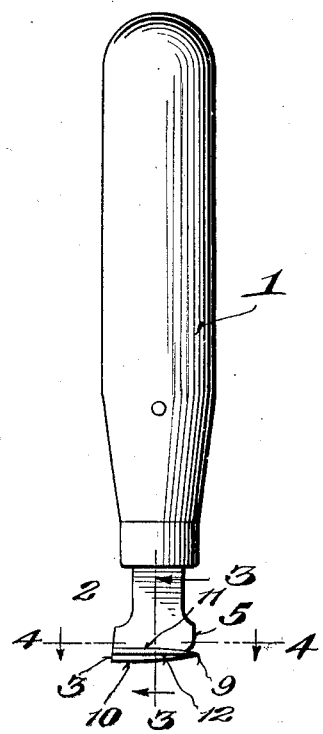
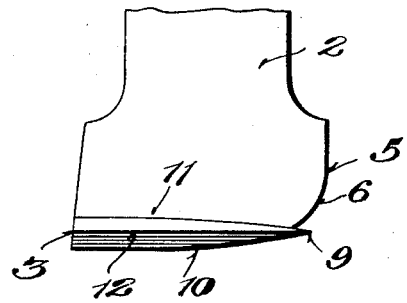
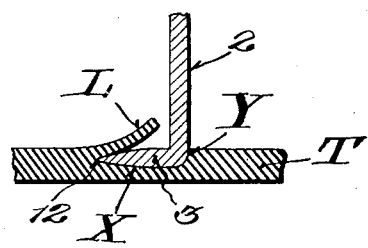
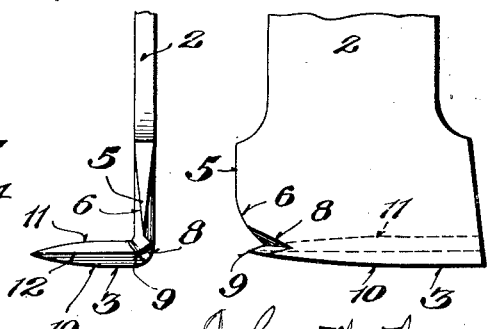
Inventor
John M. Newton
By A. W. Freeman
Attorney Patented Oct. 18, 1927.

1,646,166

UNITED STATES PATENT OFFICE.

JOHN M. NEWTON, OF SIOUX FALLS, SOUTH DAKOTA.

TIRE-REPAIR KNIFE.

Application filed January 3, 1927. Serial No. 158,729.

This invention relates to certain new and useful improvements in tire repair knives and the primary object thereof is to provide a knife of this type which performs in one operation cutting of the fabric layer of the tire and simultaneously lifting of the edge of the layer so that the latter can be grasped by pliers.

Heretofore it has been the custom to first use a knife to cut through the fabric layer and to then employ a separate pointed hook instrument to lift the edge of the cut portion, the present invention aiming to provide a simple single tool which performs both operations at one and the same time.

In the drawings:—

Fig. 1 is a front side elevation of the invention;

Fig. 2 is a similar enlarged detail view of the blade per se;

Fig. 3 is a section on line 3—3 of Fig. 1;

Fig. 4 is a section on line 4—4 of Fig. 1;

Fig. 5 is a rear edge elevation, and

Fig. 6 is a rear side elevation of the blade per se.

In proceeding in accordance with the present invention, a handle 1 is employed and to which the invention is applied. The device embodies a shank 2 secured to the handle and having its lower end bent at substantially a right angle to form a combined cutter and lifter 3 as will be now described.

As shown in Fig. 4, the blade 3 is of somewhat V-form having its outer side curved toward the front of the blade and notched at 4, while the shank 2 has a front vertical edge 5 curved inwardly and sharpened to a knife edge as indicated at 6. A notch 8 of V-shape is formed at the inner side of the shank 2 and cooperates with or merges into notch 4 to form one side of a V-shaped cutting point 9, the opposite side of which point 9 is formed by notch 4. The blade 3 has an inclined bottom 10 and an inclined top 11, the top and bottom inclining toward the point 9 thereby providing a shoe which as is evident from Fig. 3, lifts the cut layer L of the tire T during cutting by the blade. The top and bottom of the shoe and blade are bevelled to form a curved knife edge 12, which latter cuts the layer L to a degree of width so as to permit the cut edge to be gripped by pliers and removed.

In operation, the V-point 9 is initially forced into the tire by holding the shoe at an incline to the tire, whereupon the cutting edges 12 and 6 enter into action and cut the layer along right angular lines X and Y as shown in Fig. 3. The notch 8 permits the cut Y to be more easily made and also effects a cleaner cut.

From the foregoing it will be seen that the cut is effected by three edges 9, 5 and 12, all of which act simultaneously and at the same time the cut layer is lifted. The device can be easily made, since it is merely necessary to bend the free end of the strip 2 at right angles to shape same by grinding or otherwise.

It is to be also noted that the V-point 9 is located between the horizontal cutting edge 12 and the vertical cutting edge 6 so that the point 9 enters into action before the edges 6 and 12 thus effecting a gradual cut without danger of tearing the fabric.

What is claimed is:—

In a tire repair tool, a combined cutter and layer lifter embodying a shank having a free end bent outwardly at substantially right angles to form a blade, said blade having a curved outer side edge sharpened to form a horizontal curved knife edge, the front end of the horizontal part of the blade having a cut-out to form a V-shaped cutting point, the front edge of the shank being vertical and sharpened on its sides to provide a curved knife edge disposed adjacent to the V-shaped cutting point, and the rear side of the shank being formed with a V-notch which forms a side of said V-shaped cutting point, the V-shaped cutting point being located between the curved vertical and horizontal knife edges.

In testimony whereof I affix my signature.

JOHN M. NEWTON